United States Patent Office 3,751,398
Patented Aug. 7, 1973

3,751,398
SPRAY DRYING PROCESS
Klaus J. Dahl, Palo Alto, Calif., assignor to Raychem Corporation, Menlo Park, Calif.
No Drawing. Continuation-in-part of abandoned application Ser. No. 115,824, Feb. 16, 1971. This application Jan. 17, 1972, Ser. No. 218,483
Int. Cl. C08g 33/00, 53/00
U.S. Cl. 260—47 R
11 Claims

ABSTRACT OF THE DISCLOSURE

Poly (aromatic ketones) and poly (aromatic sulfones) prepared by boron trifluoride-catalyzed Friedel-Crafts condensation in hydrogen fluoride are recovered from polymerization media by spray drying hydrogen fluoride solutions of the same which contain substantial proportions of liquid sulfur dioxide, preferably from about 90 to 99% volume. At least a portion of the $SO_2$ may be present during polymerization, e.g., 50% by volume. Product spray dried with $SO_2$ is lighter in color and contains less fluorine than that arising from spray drying with HF alone, and enjoys superior heat stability in the melt as compared to product recovered by precipitation in a non-solvent. The polymer may be employed, e.g., in electrical insulation.

CROSS-REFERENCE TO RELATED APPLICATIONS

This is a continuation-in-part of my application Ser. No. 115,824, filed Feb. 16, 1971, and now abandoned and entitled, "Polyketones and Methods Therefor," and is related to my concurrently filed applications of the same title, respectively Ser. Nos. 218,465 and 218,466.

BACKGROUND OF THE INVENTION

In recent years increasing attention has been paid to poly (aromatic ketones) and poly (aromatic sulfones) arising from boron trifluoride-catalyzed Friedel-Crafts condensation polymerization in hydrogen fluoride. The hydrogen fluoride-boron trifluoride reaction system presaged in Boron Fluoride and Its Compounds as Catalysts, etc. Topchiev et al. Pergamon Press (1959), p. 122, J. Org. Chem. 26, 2401 (1961) and I & E Chem. 43, 746 (1951) is applied to such polymerizations in U.S. Pat. 3,441,538 to Marks, U.S. Pat. 3,442,857 to Thornton, and in my above-identified copending applications. The foregoing publications are expressly incorporated herein by reference to illuminate the background of this invention. In general, such polymers arise from polymerization of compounds having an aromatic ring activated toward electrophilic attack and which bear a carbonyl or sulfonyl moiety, e.g., an acyl halide, acid, acid ester or sulfonyl halide group. Alternatively, these polymers may be had by copolymerization of a polynuclear aromatic compound susceptible to electrophilic attack and a second compound bearing two such sulfonyl or carbonyl moieties. These reactions may be represented as follows, taking the case of acyl chloride monomer for purpose of illustration:

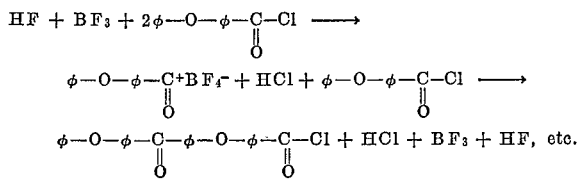

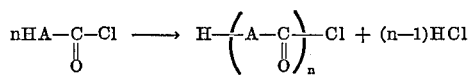
and
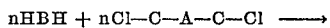

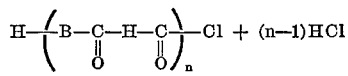

As illustrative of the mechanism of polymerization, the Friedel-Crafts acylation reaction by which phenoxybenzoyl chloride is polymerized in the presence of HF and $BF_3$ may be represented as follows:

$$HF + BF_3 + 2\phi-O-\phi-\underset{\underset{O}{\|}}{C}-Cl \longrightarrow$$

$$\phi-O-\phi-\underset{\underset{O}{\|}}{C^+}BF_4^- + HCl + \phi-O-\phi-\underset{\underset{O}{\|}}{C}-Cl \longrightarrow$$

$$\phi-O-\phi-\underset{\underset{O}{\|}}{C}-\phi-O-\phi-\underset{\underset{O}{\|}}{C}-Cl + HCl + BF_3 + HF, \text{ etc.}$$

In actual practice, it has been found that some $BF_3$ remains bound to the formed polymer, either in ionic association with ketone groups of the polymer or through formation of more loosely bound donor-acceptor complexes therewith. In addition, of course, substantial amounts of hydrgen fluoride and boron trifluoride are physically occluded in the polymer. Now, a primary application in which such polymers find utility is in the insulation of electrical components such as wire and cable. Accordingly, the acceptable fluorine content of such polymers is quite low, e.g., 200 p.p.m., preferably 100 p.p.m. This is so for a variety of reasons, not least of which is that electrically insulative coating is commonly color coded, requiring that the base polymer be as nearly colorless as possible. Excess hydrogen fluoride contained in the polymer has been found to adversely effect the color of the polymer. Excess boron trifluoride content is similarly undesirable, and especial attention must be paid to its removal when the reactive functionalities of the monomers are acid or ester groups. In these cases, boron trifluoride appears to associate with byproducts of polymerization, so that upon melt processing fluoboric acid in varying degrees of hydration or its ester is formed, both types of compounds being relatively non-volatile.

In the past, polymer resulting from boron trifluoride-catalyzed Friedel-Crafts condensation in hydrogen fluoride has been recovered and its contained hydrogen fluoride and boron trifluoride sought to be removed by precipitating the polymer in a relative non-solvent therefor, such as acetone or water. While satisfactory for some employments, this form of recovery leaves substantial amounts of hydrogen fluoride and boron trifluoride contaminant in the precipitated polymer. Moreover, such wet workup affords opportunity for solvent reactions with the polymer which diminish resistance of the ultimate product to solvent stress crazing. Additionally, I have found wet workup in a non-solvent provides polymer of diminished heat stability in the melt. From the foregoing, it will be clear that a need has arisen for an improved method of recovering such polymers from their media of polymerization.

BRIEF SUMMARY OF THE INVENTION

According to this invention, the recovery from polymerization media of solid poly (aromatic ketones) and poly (aromatic sulfones) produced by boron trifluoride-catalyzed Friedel-Crafts condensation polymerization in hydrogen fluoride is facilitated by atomizing a solution of polymer comprising liquid sulfur dioxide in substantial proportion relative to the hydrogen fluoride contained therein, and volatilizing from the resulting droplets boron trifluoride, hydrogen fluoride and sulfur dioxide. The polymer is obtained in the form of porous, free-flowing particles of reduced fluorine content and improved color, while the likelihood of operator exposure to hydrogen fluoride is reduced. Sulfur dioxide is inert toward the polymer, so that the above-mentioned disadvantages of non-solvent precipitation are obviated. Used as a cosolvent (with hydrogen fluoride) for the polymer, sulfur dioxide in appropriate concentration permits employment of metal-walled spray drying vessels, whereas hydrogen fluoride alone must be spray dried in plastic-lined vessels whose inlet gas temperature is for that reason severely restricted. Polymer spray-dried from hydrogen fluoride diluted with $SO_2$ has displayed superior heat stability in the melt. That dilution, moreover, affords substantial economies by reason of the relatively greater availability and lower cost of $SO_2$ compared to the HF with which the polymerization mixture must otherwise be diluted to a solids content suitable for spray drying. Finally, it has been found that the use of $SO_2$ aids in solubilizing certain polymers in hydrogen fluoride, such as those having biphenylyloxy benzoyl repeating units. These and other objects and advantages of the invention will become clear from the detailed description which follows.

DETAILED DESCRIPTION OF THE INVENTION

As polymers with whose production the present invention is especially concerned, there may first be mentioned poly(aromatic ketones) comprised in whole or part of repeating units of the structure

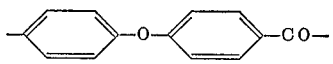

i.e., poly(benzophenone ether). As especially preferred, there may be mentioned homopolymers and copolymers having such repeating units and displaying mean inherent viscosity within the range from about 0.8 to about 1.65, all as disclosed in my said concurrently filed application Ser. No. 218,465. Secondly, there may be mentioned poly-(aromatic ketone) characterized by the repeating unit

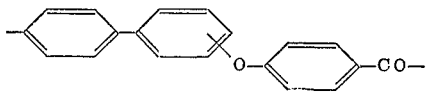

and especially homopolymers of para-biphenylyloxybenzoyl monomers and copolymers thereof formed with minor proportions of corresponding ortho- and/or meta-comonomer, polymers having mean inherent viscosity between about 0.5 and about 1.7 being preferred. Such polymers and the manner of their obtainment are fully described in my said concurrently filed application Ser. No. 218,466. In the case of each polyketone, boron trifluoride tends ionically to associate with ketone groups of the polymer, and associates as well with the water and alcohols, which are respectively the byproducts of acid and ester polymerization. Upon heating, as in melt procesing, $BF_3$ associated with such byproducts may form undesirable, relatively non-volatile fluoboric acids and acid esters. Both in this fashion, and by physical occlusion in polymer worked up by precipitation in non-solvents, such polymers as previously processed have contained undesirable amounts of fluorine compounds. It has now been found, as noted above, that spray drying such polymer from liquid sulfur dioxide-containing solution results in polymer of reduced fluorine content and improved color. $SO_2$ is believed to deprotonate ketone moieties of the polymer, so that $BF_3$ is held not in ionic association therewith, but more loosely in a donor-acceptor complex. It is believed similarly to influence the manner in which polymerization byproducts bind $BF_3$. Since heating during spray drying also acts to free bound $BF_3$, the question whether the beneficial effects of $SO_2$ are attained in significant part by this mechanism has yet to be quantitatively answered, and I wish not to be bound to any theory respecting the manner in which heat stability, color and other properties are enhanced by the presence of $SO_2$.

Some degree of improvement is attained where any substantial portion of the polymer-containing solution is sulfur dioxide, but preferably the solution spray-dried contains a major proportion of liquid sulfur dioxide, e.g., from about 50 to about 99 volume percent $SO_2$. At least a portion, e.g., about 50 to about 90 volume percent may be added to the polymerization medium prior to formation of the polymer. Alternatively, albeit less desirably, all of the $SO_2$ may be added during dilution of the product of polymerization to levels of contained polymer optimal for spray drying. Typically, the solution resulting from the polymerization step contains about 15 to about 25 percent by weight polymer, and for spray drying this is diluted by $SO_2$ addition to less than about 10 percent, preferably less than about 5 weight percent polymer. Best results have been obtained in present equipment with from about 1 to about 2 weight percent polymer and 90–99, preferably about 93–99 volume percent liquid $SO_2$. It will be appreciated that the use of $SO_2$ in such amounts markedly diminishes the possibility of corrosion in the spray drying vessel.

The polymer solution may be atomized in, e.g., a single fluid pressure nozzle or a two fluid nozzle in which latter the polymer stream is subjected to an annulus of high velocity gas, e.g., air, which effects atomization. The two fluid nozzle is preferred as capable of handling polymer solution of greater viscosity and because incoming polymer must be pressurized only sufficiently to overcome pressure drop through the lines and across the nozzle, e.g., 10–50 p.s.i.g., most commonly about 20 p.s.i.g. Single fluid nozzles, on the other hand, commonly require operation at pressures on the order of, e.g., 100 p.s.i.g. No matter in what fashion the solution is atomized, the resulting fan or cone of droplets is contacted with a gas at elevated temperature such as hot air to volatilize $BF_3$, $SO_2$ and HF. While the boiling temperatures of all these contaminants is quite low, it is preferred for practical processing that the drying gas be at substantially elevated temperature, preferably greater than 150° C. With about 300–450 s.c.f.m. inlet air at about 190–220° C., product having but about 2–5 weight percent fluorine is obtained, while greater inlet temperatures (e.g., 260–350° C.) can be expected to obviate the further oven-drying step otherwise required for reduction of fluorine content to 100–200 p.p.m.

The spray dried polymer is separated from gases in a conventional cyclone, and the gases passed through a caustic soda scrubbing tower. Alternatively, HF, $SO_2$ and so on may be recovered by successive condensation of HF, then, $SO_2$, and ultimately $BF_3$, which latter may alternatively be scrubbed with hydrogen fluoride from $BF_3$-air mixture and returned in that form to polymerization. Inevitably, the relative incondensability of air leads to more $BF_3$ loss, and this loss may be alleviated by substituting gaseous $SO_2$ for air, both in drying and (where the two fluid nozzle is employed) in atomization.

The process as presently practiced with poly(benzophenone ether) is next illustrated. A hydrogen fluoride solution of 25 weight percent polymer is diluted with liquid sulfur dioxide to a solids content of 1.3%. This brings about a decrease in solution viscosity from 1900 cp. to 2 cp. The solution, contained in a poly(chlorotrifluoroethylene) coated vessel is then fed to a laboratory spray dryer (Koch model 10D, 1 meter diameter) at about −6° C. to prevent $SO_2$ vaporization in the lines. An air pressure of 5–15 p.s.i.g. in the feed vessel provides the driving force to overcome frictional losses in lines and valves. All materials of construction are chosen for maximum corrosion resistance and include fluoroplastics, Hastelloy C, and 304 stainless steel.

The spray dryer consists of a hot gas plenum with a perforated plate through which the hot gases (air in the present case) pass prior to contact with the liquid spray, an insulated cylindrical drying chamber with a conical bottom, and a cyclone separator to separate the solid polymer powder from the hot gases. The $HF/SO_2/BF_3$ polymer solution is atomized in a Lurgi two-fluid Hastelloy C nozzle with air at a flow rate of approximately 11 s.c.f.m. and 20–40 p.s.i.g. being supplied to the nozzle at ambient temperature. The nozzle is located below the perforated plate in the cylindrical chamber on the center line of the cylinder.

The spray dryer, cyclone separator, and associated ducting are constructed of 304 stainless steel with all flanged joints sealed with silicone rubber adhesive sealant.

Braided poly(tetrafluoroethylene) protection gaskets are located between the inside surface of the dryer and the sealant. The exhaust gases are cooled in a 304 stainless steel after cooling tower by passing them through several cold water sprays. The gases are then scrubbed in a polypropylene lined caustic scrubbing tower. The nozzle and the supporting lance are constructed of Hastelloy C.

The polymer solution is fed to the two-fluid nozzle at a rate of 17 gal./hr. and at a temperature of −6° to ensure that no vaporization of the solvents occurs prior to the discharge end of the nozzle. Hot air used as the drying medium enters the dryer at 220° at a rate of 446 s.c.f.m. and exits at 160°. Heat losses due to mixing of hot and cold air streams and heat transfer through the insulation account for 20–30° of the noted temperature drop. The remainder of the thermal energy is used to vaporize the solvent. The hot air enters the spray dryer at a pressure of 30 inches of water and enters the cyclone separator at a pressure of 20 inches of water.

The polymer is collected at the bottom of the cyclone separator in the form of a powder (e.g., bulk density .08–.15 gm./cm.$^3$, particle size 10–100 microns). The powder is heated at 150° under vacuum overnight in an oven to remove final traces of volatile components. A sample is taken of the dried material to determine the level of residual fluorine. The polymer is first fused with sodium peroxide at elevated temperature in a sealed nickel bomb ("Chemistry of Organic Fluorine Compounds," by Milos Hudlicky, The MacMillan Co., New York, 1962, p. 322), followed by a spectrophotometric determination of fluorine with a zirconium Eriochrome Cyanine R lake [Stephen Megregian, Anal. Chem., 26, 1161 (1954)]. The polymer is usually found to contain 50 to 100 p.p.m. of fluorine, and is suitable for melt extrusion after roller compacting.

In order to evaluate the beneficial effect of $SO_2$ spray drying on intrinsic polymer properties, ten slabs of polymer resulting from the boron trifluoride-catalyzed polymerization of p-phenoxybenzoyl chloride in hydrogen fluoride were pressed. Polymer in five of the slabs had been worked up by diluting the hydrogen fluoride polymerization medium to 95 volume percent liquid $SO_2$ followed by spray drying in the fashion described above. In the case of the remaining slabs, polymer solution containing 75 volume percent $SO_2$ was added to an 80:20 mixture of $SO_2$ and acetone to precipitate the polymer. In each case, the resulting slabs were held for various periods at 410° C., after which color and inherent viscosity were evaluated. The following data was taken:

TABLE

| Time, min. at 410° | Polymer | | | |
|---|---|---|---|---|
| | Spray dried | | Liquid work-up | |
| | $\eta$inh [2] | Color [1] | $\eta$inh [2] | Color |
| 0 | 1.31 | | 1.29 | |
| 5 | 1.39 | 1 | 1.24 | 7 |
| 10 | 1.45 | 3 | 1.25 | 8 |
| 20 | 1.27 | 3 | 1.39 | 9 |
| 40 | 1.19 | 4 | [3] 1.47 | 10 |

[1] Color rating: 1=almost colorless; 10=dark brown.
[2] Mean inherent viscosity (0.1 g. polymer in 100 ml. soln. of conc. $H_2SO_4$ at 25° C.).
[3] Gel particles were observed.

From the above, it will be clear that the polymer spray dried in sulfur dioxide enjoys superior high temperature stability. Moreover, from the foregoing table it can be seen that significantly less fortuitous coloration is observed in the spray dried polymer.

Having fully described my invention with especial reference to the preferred embodiments thereof in the manner required by law, I wish it understood that the invention is not limited thereto, but only to the lawful scope of the appended claims.

What is claimed is:

1. In the recovery from polymerization media of solid poly(aromatic ketones) and poly(aromatic sulfones) produced by boron trifluoride-catalyzed condensation polymerization in hydrogen fluoride, the improvement which comprises atomizing a solution of polymer comprising liquid sulfur dioxide in substantial proportion relative to the hydrogen fluoride contained therein, and volatilizing from the resulting droplets boron trifluoride, hydrogen fluoride and sulfur dioxide to provide particulate polymer product.

2. The method of claim 1 wherein at least a portion of said liquid sulfur dioxide is present in the medium of polymerization prior to the formation of said polymer.

3. The method of claim 1 wherein said solution contains from about 50 to about 99 percent by volume liquid sulfur dioxide.

4. The method of claim 3 wherein said solution contains less than about 10 percent by weight polymer.

5. The method of claim 4 wherein said solution contains from about 90 to 99 percent by volume liquid sulfur dioxide and less than about 5 percent by weight polymer.

6. In the recovery from boron trifluoride and hydrogen fluoride-containing polymerization media of polymer having repeating units selected from the group consisting of —$\phi$—O—$\phi$—CO— and —$\phi$—$\phi$—O—$\phi$—CO—, the improvement which comprises atomizing a solution of said polymer comprising liquid sulfur dioxide in substantial proportion relative to the hydrogen fluoride contained therein and volatilizing from the resulting droplets boron trifluoride, hydrogen fluoride and sulfur dioxide to provide particulate polymer product.

7. The method of claim 6 wherein said solution contains from about 50 to about 99 percent by volume sulfur dioxide and less than about 10 percent by weight polymer.

8. The method of claim 7 wherein said solution contains from about 90 to about 99 percent by volume sulfur dioxide.

9. The method of claim 6 wherein said solution contains less than about 5% by weight polymer, and from about 90 to about 99 percent by volume sulfur dioxide.

10. The method of claim 9 wherein said polymer is poly(benzophenone ether).

11. The method of claim 1 wherein volatilization is achieved by contacting a stream of said solution with gaseous sulfur dioxide at a temperature greater than about 150° C.

References Cited

UNITED STATES PATENTS 3,441,538   4/1969   Marks.
3,442,857   5/1969   Thornton.

MELVIN GOLDSTEIN, Primary Examiner

U.S. Cl. X.R.

260—2 R, 30.8 R, 49, 61, 78.4 R & E, 79.3 M